(12) United States Patent
Wong et al.

(10) Patent No.: US 8,212,781 B2
(45) Date of Patent: Jul. 3, 2012

(54) ELECTRONIC DEVICE WITH BEZEL FEATURE FOR RECEIVING INPUT

(75) Inventors: Yoon Kean Wong, Redwood City, CA (US); William Robert Hanson, Mountain View, CA (US); Shawn R. Gettemy, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 544 days.

(21) Appl. No.: 11/426,303

(22) Filed: Jun. 24, 2006

(65) Prior Publication Data

US 2006/0232553 A1    Oct. 19, 2006

Related U.S. Application Data

(62) Division of application No. 10/006,342, filed on Nov. 30, 2001, now Pat. No. 7,091,964.

(51) Int. Cl.
*G09G 5/00* (2006.01)
*G06F 3/048* (2006.01)

(52) U.S. Cl. ........................ 345/173; 715/834

(58) Field of Classification Search .......... 345/156–158, 345/173, 184; 715/773, 856, 863, 866; 178/18.01, 178/18.03, 18.07, 18.1, 19.01
See application file for complete search history.

(56) References Cited

U.S. PATENT DOCUMENTS

| | | | |
|---|---|---|---|
| 4,910,503 A | 3/1990 | Brodsky | |
| 4,932,045 A | 6/1990 | Kasoff et al. | |
| 5,050,139 A | 9/1991 | Oberst | |
| 5,392,388 A * | 2/1995 | Gibson | 715/837 |
| 5,495,566 A | 2/1996 | Kwatinetz | |
| 5,706,448 A | 1/1998 | Blades | |
| 5,844,561 A * | 12/1998 | Tanimoto et al. | 715/703 |
| 5,903,229 A * | 5/1999 | Kishi | 341/20 |
| 5,940,076 A | 8/1999 | Sommers et al. | |
| 5,983,073 A | 11/1999 | Ditzik | |
| 6,281,940 B1 | 8/2001 | Sciammarella | |
| 6,297,795 B1 | 10/2001 | Kato et al. | |
| 6,331,867 B1 | 12/2001 | Eberhard et al. | |
| 6,335,725 B1 | 1/2002 | Koh et al. | |
| 6,407,379 B1 | 6/2002 | Shinbo | |
| 6,425,129 B1 | 7/2002 | Sciammarella et al. | |
| 6,466,236 B1 | 10/2002 | Pivowar et al. | |
| 6,468,212 B1 | 10/2002 | Scott et al. | |
| 6,477,117 B1 | 11/2002 | Narayanaswami et al. | |
| 6,483,500 B1 * | 11/2002 | Choi et al. | 345/184 |
| 6,535,461 B1 | 3/2003 | Karhu | |
| 6,556,222 B1 | 4/2003 | Narayanaswami | |
| 6,597,279 B1 | 7/2003 | Haraguchi | |
| 6,633,930 B2 | 10/2003 | Sonehara et al. | |
| 6,968,508 B2 | 11/2005 | Lucaci et al. | |
| 7,046,230 B2 | 5/2006 | Zadesky et al. | |
| 7,091,964 B2 | 8/2006 | Wong et al. | |
| 2001/0026678 A1 | 10/2001 | Nagasaka et al. | |
| 2002/0140633 A1 | 10/2002 | Rafii et al. | |
| 2003/0095156 A1 * | 5/2003 | Klein et al. | 345/864 |
| 2003/0115384 A1 | 6/2003 | Sonehara et al. | |
| 2003/0117380 A1 * | 6/2003 | Kanzaki | 345/173 |

FOREIGN PATENT DOCUMENTS

JP    11-166983    6/1999

OTHER PUBLICATIONS

Final Office Action for U.S. Appl. No. 11/462,679 mailed Mar. 5, 2009.

(Continued)

*Primary Examiner* — Kevin M Nguyen (57) ABSTRACT

An electronic device includes a bezel feature, a connector and a processor. The bezel feature is rotatable amongst a plurality of positions on an arc length that defines a path of motion for the bezel feature. The plurality of positions are distributed along the entire arc length of the path of motion. An interface or connector couples the bezel feature to the processor of the electronic device.

12 Claims, 8 Drawing Sheets

OTHER PUBLICATIONS

Final Office Action for U.S. Appl. No. 11/462,679 mailed Jan. 28, 2008.
Non-Final Office Action for U.S. Appl. No. 11/462,679 mailed Aug. 12, 2009.
Non-Final Office Action for U.S. Appl. No. 11/462,679 mailed Jul. 21, 2008.
Non-Final Office Action for U.S. Appl. No. 11/462,679 mailed May 1, 2007.
Final Office Action for U.S. Appl. No. 11/462,679 mailed Feb. 26, 2010, 14 pages.
Non-Final Office Action for U.S. Appl. No. 11/462,679 mailed Jun. 25, 2010; 14 pages.

* cited by examiner

ELECTRONIC DEVICE WITH BEZEL FEATURE FOR RECEIVING INPUT

PRIORITY

This application is a divisional of U.S. patent application Ser. No. 10/006,342 filed Nov. 30, 2001 now U.S. Pat. No. 7,091,964, entitled "Electronic Device With Bezel Feature For Receiving Input". The aforementioned priority application is hereby incorporated by reference.

FIELD OF THE INVENTION

The present invention relates to electronic devices. In particular, the present invention relates to input devices for electronic devices.

BACKGROUND OF THE INVENTION

Input mechanisms for many electronic devices, including handheld computers such as personal digital assistants (PDAs), tend to be have either an actuated or non-actuated state. For example, electronic devices tend to use buttons that can be actuated with a button press.

Some electronic devices, such as mobile phones and personal digital assistants manufactured by the SONY CORP., utilize a jog dial. The jog dial is a bezel that is typically rotatable between a non-actuated state and an actuated state. The jog dial is relatively small, and tends to be partially embedded within the housing. In many devices, the jog dial can be rotated a small distance about a center axis. That distance is only a small portion of its overall circumference. In many instances, the number of input values that can be entered through use of a jog dial is relatively small. For example, rotating the jog dial may cause one input value to be entered. The position of the jog dial may be varied so that the number of inputs per second, where each input has the same value, may be varied from slow to fast depending on the position of the jog dial about its rotation.

SUMMARY OF THE INVENTION

According to an embodiment, an electronic device is provided having a rotating bezel for entering user-input. The bezel can be rotated amongst multiple positions, where each position is on an arc length that defines a path of motion for the bezel feature. The arc length of the bezel feature may extend 360 degrees. The electronic device may include an interface. A processor may be coupled to the bezel feature via the interface to detect any one of the plurality of positions for the bezel feature. The processor may perform one or more operations based on the detected position of the bezel feature.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Embodiments of the invention describe en electronic device having a bezel feature for receiving input. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

In an embodiment, an input device for an electronic device corresponds to a bezel. The bezel can rotate along an arc length. Multiple positions of the bezel are detectable along the arc length. Each position corresponds to an input. A new position for the bezel may be detected. The new bezel position corresponds to an input value that can be processed by the electronic device.

The term "arc length" refers to an arcuate path that can be traced by the bezel feature. The arcuate path may be circular or oval.

B. Bezel Feature on Exterior Housing Panel

Figure 1:
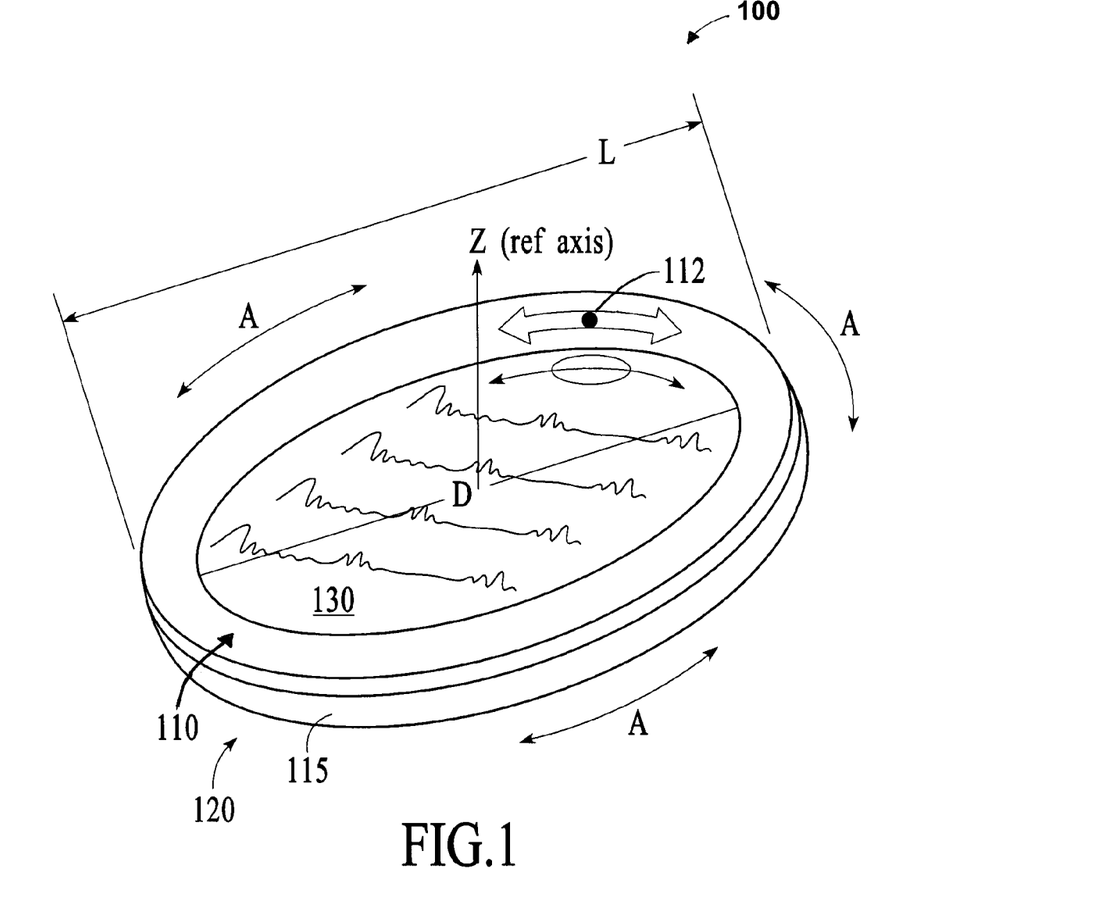
FIG. 1 is an isometric front view of an electronic device having a bezel feature, under an embodiment of the invention.

FIG. 1 illustrates an electronic device 100, under an embodiment. The electronic device 100 may be oval or circular in shape. The electronic device 100 includes a housing 120. An exterior housing panel 115 provides a bezel feature 110 and a display 130. The bezel feature 110 encircles or circumvents display 130.

According to an embodiment, bezel feature 110 may be moved along an arcuate path, shown by arrow A, and provided a rotation axis Z. The bezel feature 110 may include one or more pointers that indicate a relative position of the bezel feature 110 along its arc length. In one embodiment, a first pointer 112 is detectable at a plurality of positions on the arc length of the bezel feature 110. The detectable positions may include, for example, one position at every n degrees between 0 and 360 degrees, depending on how much sensitivity is desired from bezel feature 110.

As will be described in FIG. 7, each detectable position of bezel feature 110 may cause input to be entered. When bezel feature 110 is in motion, each position that is moved across by pointer 112 may cause an input to occur, so that a series of inputs is sequentially entered as the bezel feature 110 is moved from a first position to a second position. Alternatively, the input may correspond to the starting and resting points of pointer 112, so that input is not continuously updated as pointer 112 is moved along the arc length. Rather, the value of the input is detected when the bezel feature 110 is brought to rest.

Input entered as a result of bezel feature 110 rotating may affect content appearing on display 130. For example, rotation of bezel feature 110 may correspond to scrolling data entries appearing on display 130, or navigating through applications that can be launched from selection on the display.

The discrete inputs offered by bezel feature 110 may be visually identifiable by the user. For example, a user may know that positioning the pointer 112 at 90, 180, 270 or 360 degrees along the arc length will cause different specified applications to be launched. Furthermore, there are numerous positions that are discretely identifiable along the arc length of the pointer's motion.

A sensor cue or tactile feedback may be combined with bezel feature 110 to provide the user with sensory feedback, so that as the bezel feature 110 is moved, the pointer 112 occupies several discrete positions. Because numerous, identifiable inputs may be entered through use of bezel feature 110, the need for buttons or other button-type switches may be avoided, or entirely eliminated.

In an embodiment, dimensions of bezel feature 110 include a diameter length D. The diameter length D corresponds to a diameter of the arc length if the arc length is circular. The diameter length D corresponds to the longest diameter of the arc length if the arc length is elliptical. According to one embodiment, D is greater than a length L (the greatest dimension) of electronic device 100. In another embodiment, D is at least 50% of L. In still another embodiment, D is at least 80% of L.

Figure 2:
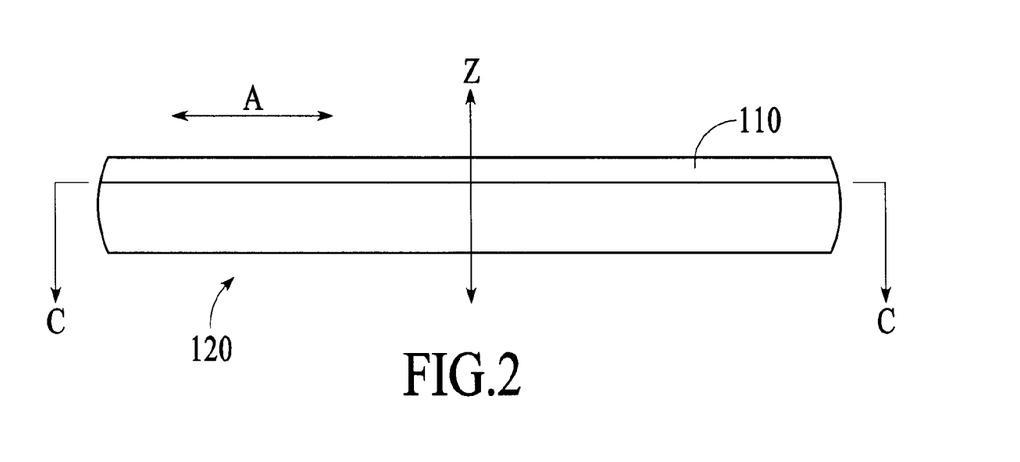
FIG. 2 is a side view of FIG. 1.

FIG. 2 is a side view of electronic device 100. Bezel feature 110 may be provided as an exterior front panel of housing 120. A thickness of electronic device 100 may be measured along axis Z. The bezel feature 110 may be mounted so as to form the exterior portion with the greatest thickness. The display 130 may be relatively sunken relative to bezel feature 110.

C. Display Assembly with Bezel Feature

Figure 3:
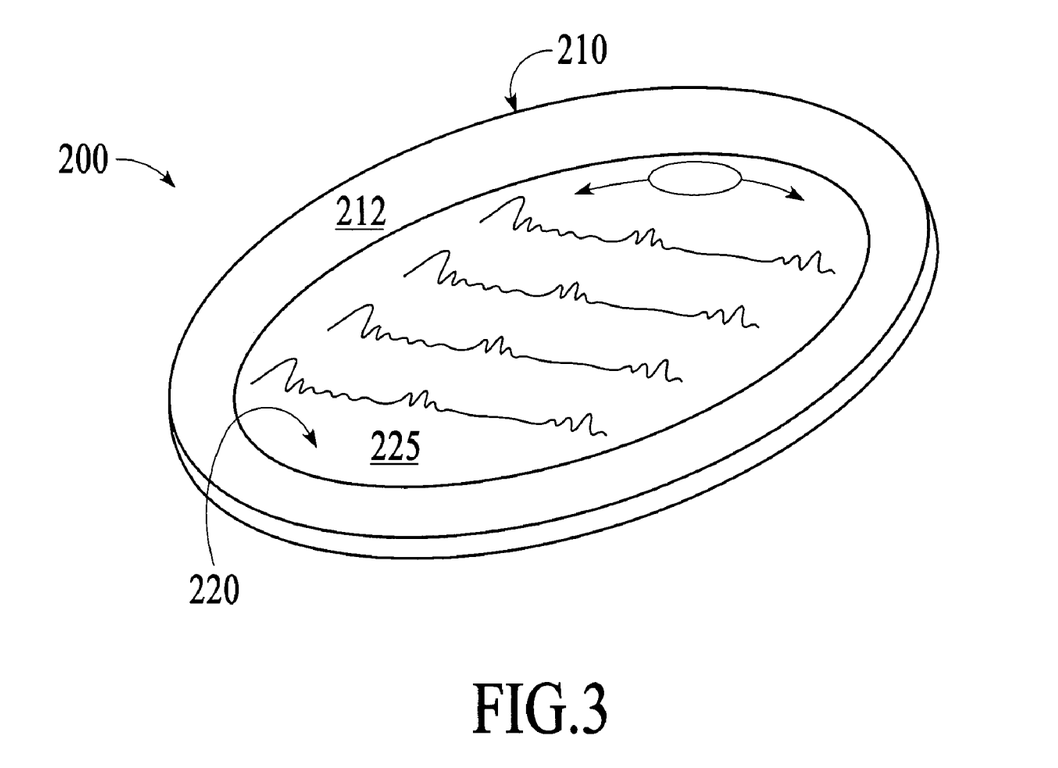
FIG. 3 is an isometric front view of an electronic device having a bezel lid in a closed position, under another embodiment of the invention.

FIG. 3 illustrates an electronic device 200, under an embodiment of the invention. The electronic device 200 includes a housing 210 and a display assembly 220. The shape of electronic device 200 may be oval or circular. The housing 210 includes a top segment 212 that circumvents display 220. The display 220 may be contact sensitive.

In an embodiment, the bezel feature includes a lid 225 rotatably mounted over display 220. The lid 225 may be rotatable when in a closed position over display 220. The lid 225 may enable display 220 to be viewed. The lid 225 may be operated as a bezel feature similar to any of the embodiments described herein.

Figure 4:
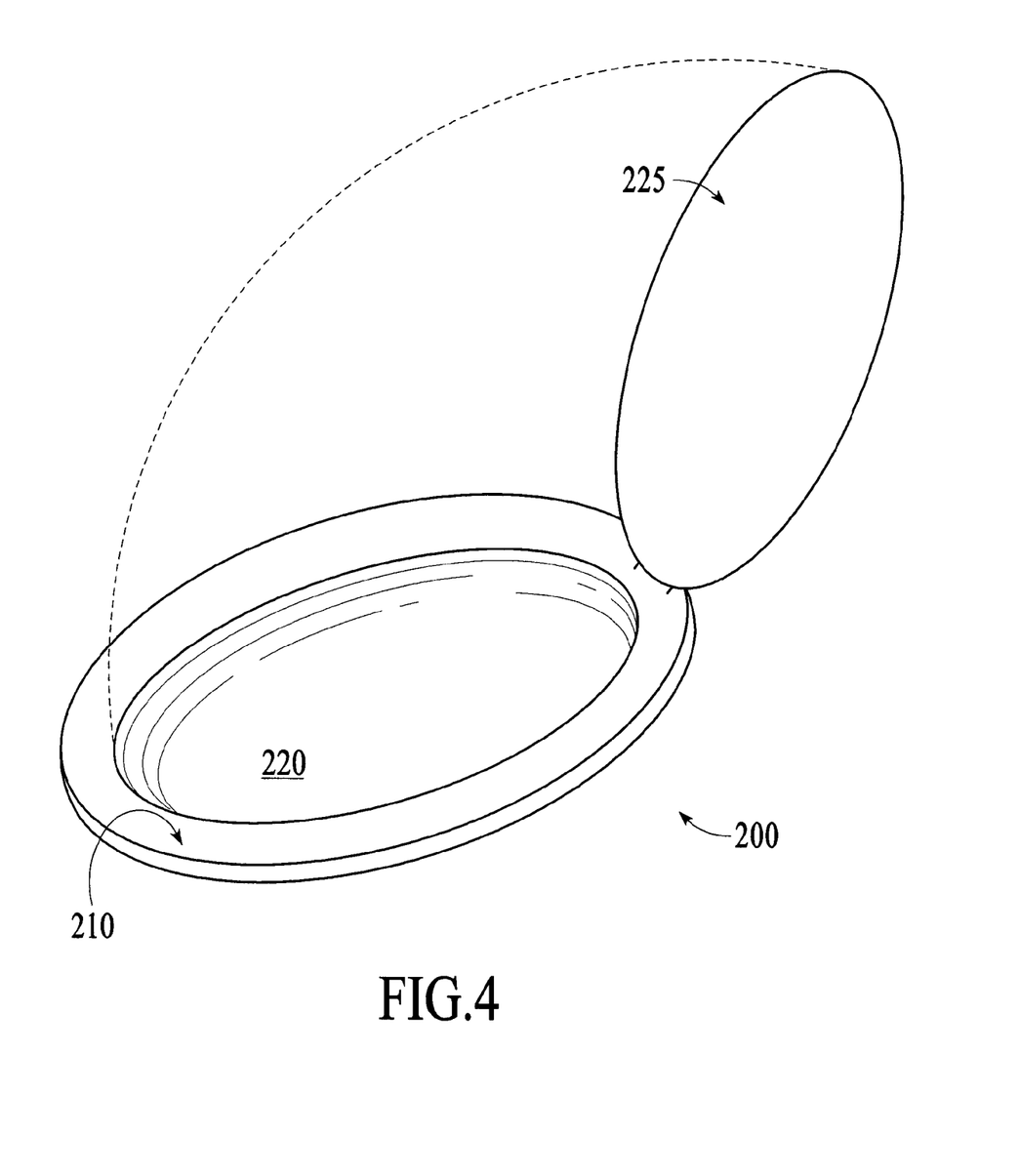
FIG. 4 is an isometric front view of an electronic device having a bezel lid in an extended position, under an embodiment of the invention.

FIG. 4 illustrates lid 225 of electronic device 200 in an extended position. The lid 225 may be moved to an extended position relative to a housing 210 in order to enable a user to enter input by making contact with display 220. The lid 225 may be closed to operate the lid as a bezel. When closed, input cannot be entered through contact with display 220. But the lid 225 may be moved to the open position to allow users to make contact with the display 220.

D. Bezel Feature Embedded in Housing Panel

Figure 5:
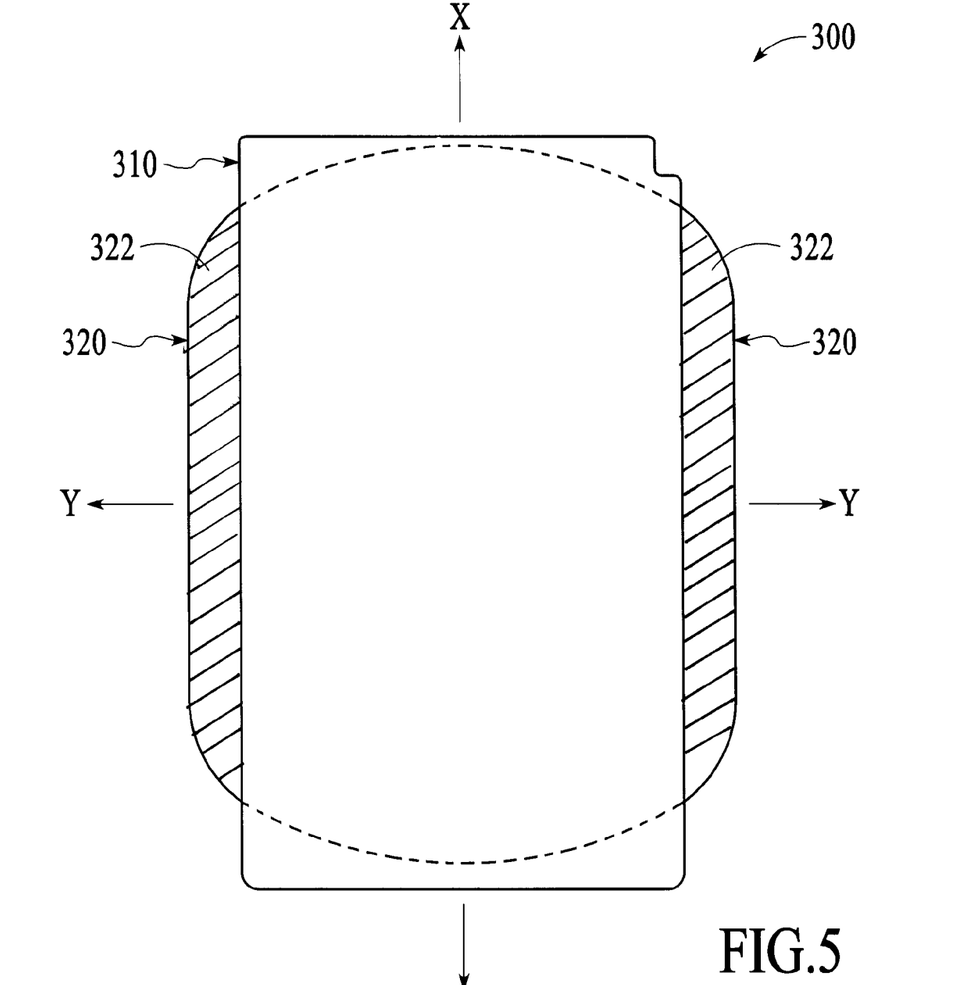
FIG. 5 is a front view of an electronic device having an embedded bezel feature, under another embodiment of the invention.

FIG. 5 a top view of an electronic device 300 having an embedded bezel feature, under another embodiment of the invention. The electronic device 300 includes a housing 310. A bezel 320 is partially contained within housing 310. One or more bezel extensions 322 may extend from the housing 310 along an axis X or Y.

The bezel extensions 320 may be rotated in order to position one or more bezel pointers along an arc length that defines the bezel's path of motion. Even though the bezel 320 is partially embedded within housing 310, the arc length of the bezel's rotation may be sufficient to enable pointers to be positionable at 90 degree intervals.

Figure 6:
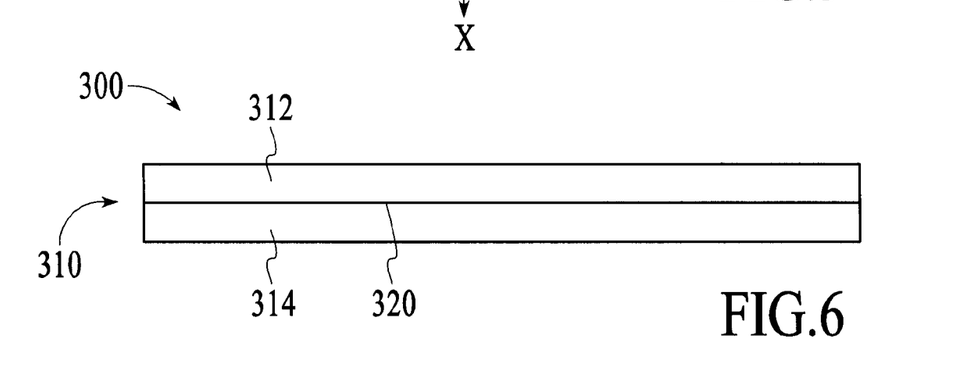
FIG. 6 is a side view of FIG. 5.

FIG. 6 is a side view of electronic device 300. The housing 310 includes a top segment 312 and a bottom segment 314. Other segments such as a midframe may be included with housing 310. The bezel 320 is provided between the top segment 312 and bottom segment 314.

E. Electrical Connectivity of Mechanical Bezel Feature

According to embodiments of the invention, rotation of a bezel feature such as described with FIGS. 1-6 may be provided through a wireless link between the bezel feature and an interface on the electronic device.

Figure 7:
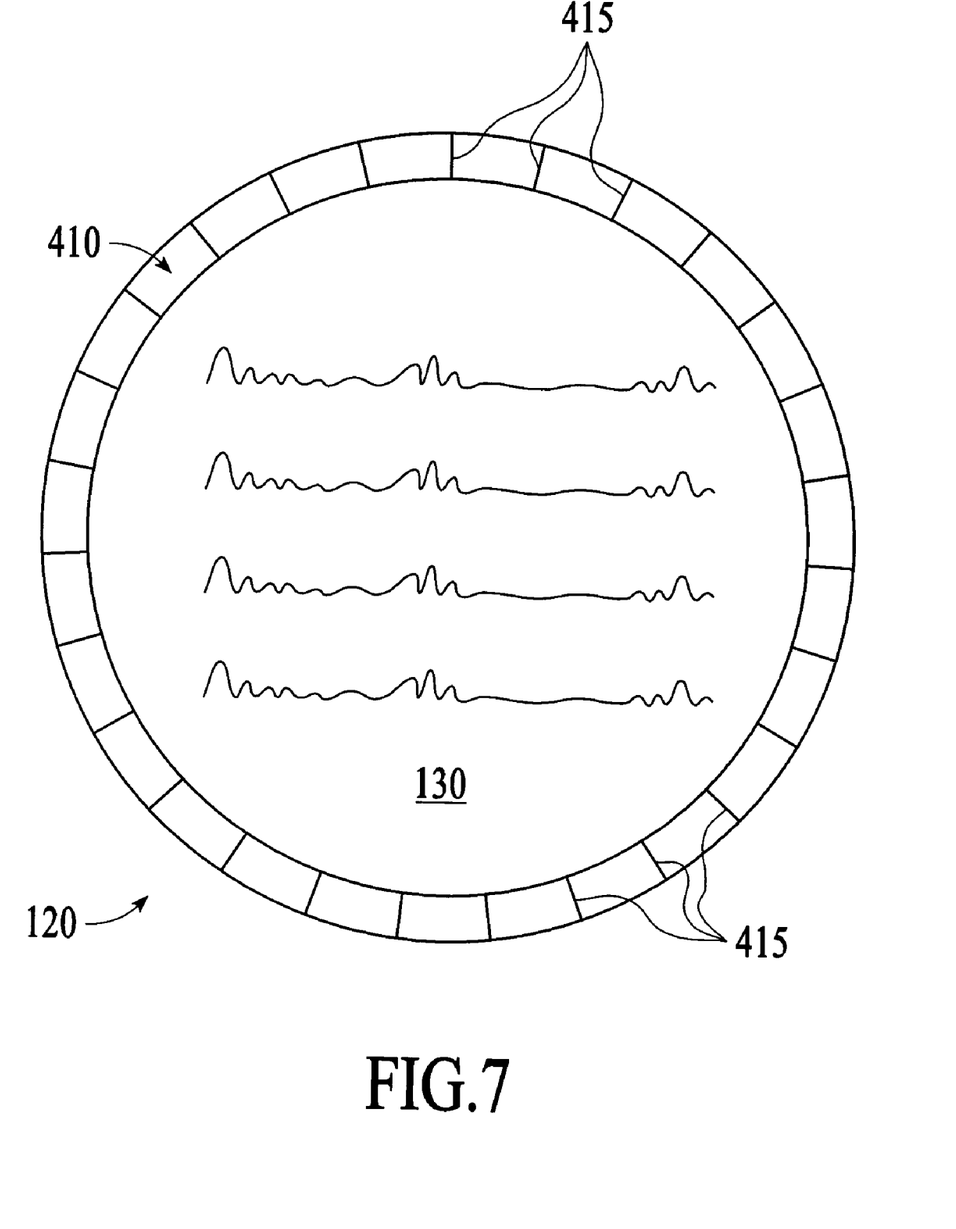
FIG. 7 is a cross-sectional view of FIG. 2, cut along lines A-A, illustrating an interface for a bezel feature.

FIG. 7 is a cross-sectional view of FIG. 2, cut along lines C-C. FIG. 7 illustrates a bezel track 410, for use with bezel feature 110 (FIGS. 1 and 2). The bezel track 410 may be configured or adapted for any of the mechanical bezel features described or covered by this application.

The bezel track 410 is formed as a pair of concentric ellipses on a periphery of the housing 120 section shown by the cross-section. The bezel track 410 encircles display 130.

In an embodiment, bezel track 410 includes a plurality of markers 415. Each marker 415 may include a sensor for detecting pointer 112 (FIG. 1) on bezel feature 110. Connectivity of bezel feature 110 may be established in one of several ways. In one embodiment, pointer 112 is positioned on the underside of bezel feature 110 and made from magnetized material. The markers 415 are also formed from magnetized materials. When pointer 112 is moved over one of the markers 415, a position is registered for the pointer 112. This position may be converted to an input value.

Other mechanisms may be used to register movement of bezel feature 110 as input. For example, markers 415 may correspond to light sensors that detect a particular light emission change created by pointer 112. The pointer 112 may be opaque, while the rest of bezel feature 110 is dark. Each marker 415 may provide a light emission and a sensor that detects a reflection of that light emission on the underside of the bezel feature 110. Each marker 415 may detect when pointer 112 crosses over it because the opaque material used for pointer 112 alters or limits the reflection off the marker's light emission.

In another embodiment, markers 415 may be formed from contact-sensitive material that protrudes from a plane forming a remainder of the track. The pointer 112 may be formed from a flexible material that can give when a protrusion is encountered. Pointer 112 initiates contact with one or more of the markers 415 as it moves over the track 410. The contact-sensitive material used to form markers 415 detects the contact.

Position information detected by the position of pointer 112 over track 410 is converted into an input value. In an embodiment, the position information may be detected as an analog value, especially if a resistive detection mechanism is used. The position information may be converted to an input value that corresponds to the position of the pointer 112 on the track 410. The number of markers 415 employed, as well as their relative positioning, may be a design factor based on the variations in input value desired.

F. Virtual Bezel Feature

Figure 8:
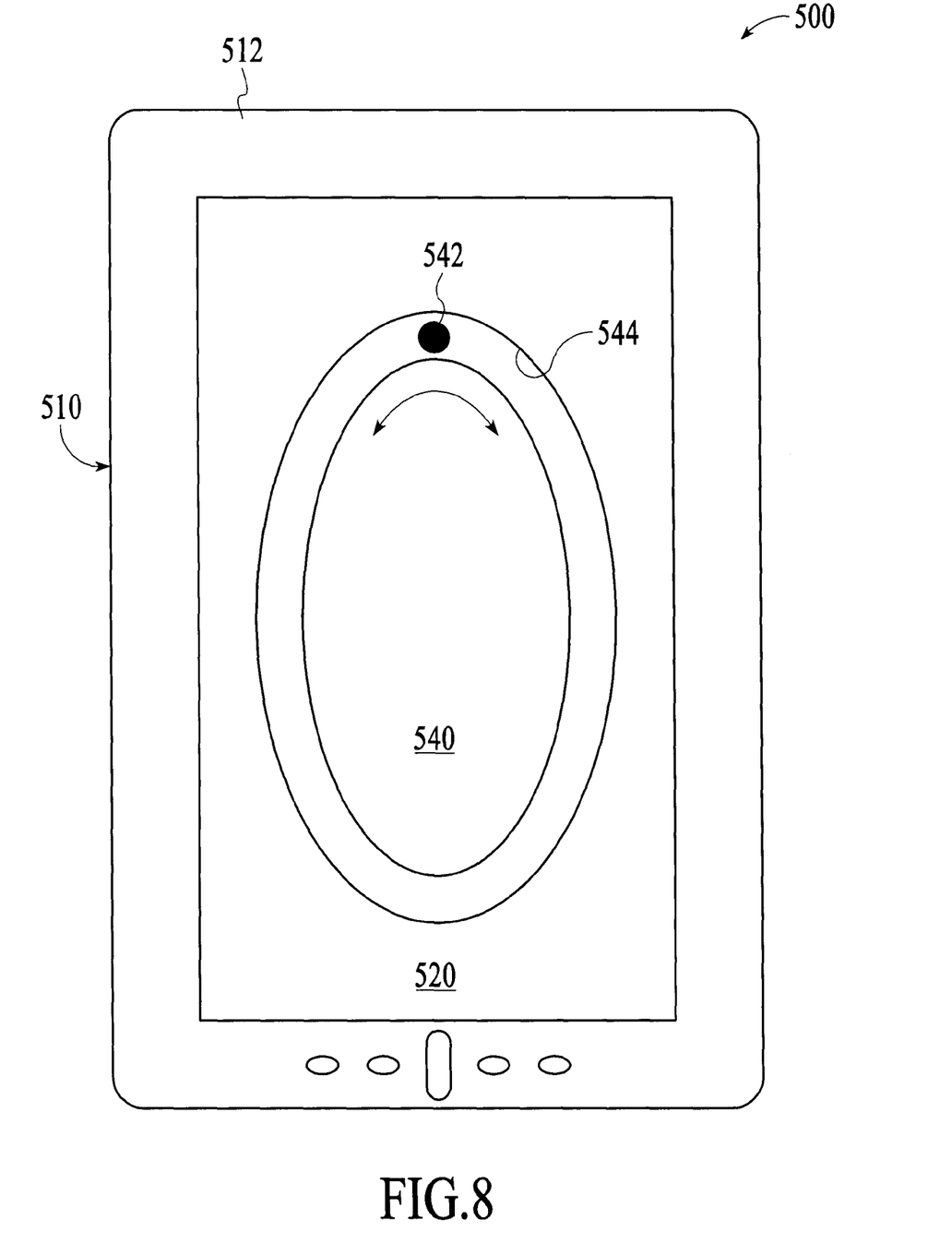
FIG. 8 illustrates a virtual bezel feature, under an embodiment of the invention.

FIG. 8 illustrates a virtual bezel feature, under an embodiment of the invention. An electronic device for use with an embodiment of the invention may be a personal digital assistant (PDA). The PDA 500 includes a housing 510, having a front panel 512. A display 520 may be provided on the front panel 512. A plurality of internal components, such as a processor and memory described with FIG. 10, may be used to provide content and user-interface features on display 520. The display 520 is contact-sensitive.

A virtual bezel feature 540 may be provided as a logical element of PDA 500. Software, hardware and/or firmware may be used to create the bezel feature 540. The user may select to have the bezel feature 540 appear on display 520. The bezel feature 540 may include a track 544, having a moveable icon 542 appearing on it.

In order to operate the bezel feature 540, the user may take a pointing device, such as a stylus, and drag the moveable icon 542 from a starting position on track 544 to a new position. Alternatively, the user may click the starting position on track 544, and then the finishing point, rather than drag the icon 542 from the start to finish.

The input processed by the bezel feature 540 may have a value based on the change in arc length from the starting and finishing point of the icon 542. The virtual bezel feature 540 provides users with a mechanism to anticipate an input value based on a visual indication—the change in arc length of the icon 542. For example, in a address book application, the starting point of the icon 542 may coincide with names that start with the letter "A". If the user wants to look at names that start with the letter "M", the user may cause icon 542 to be moved along track 544 180 degrees.

G. Method for Operating Electronic Device with Bezel Feature for Input

Figure 9:
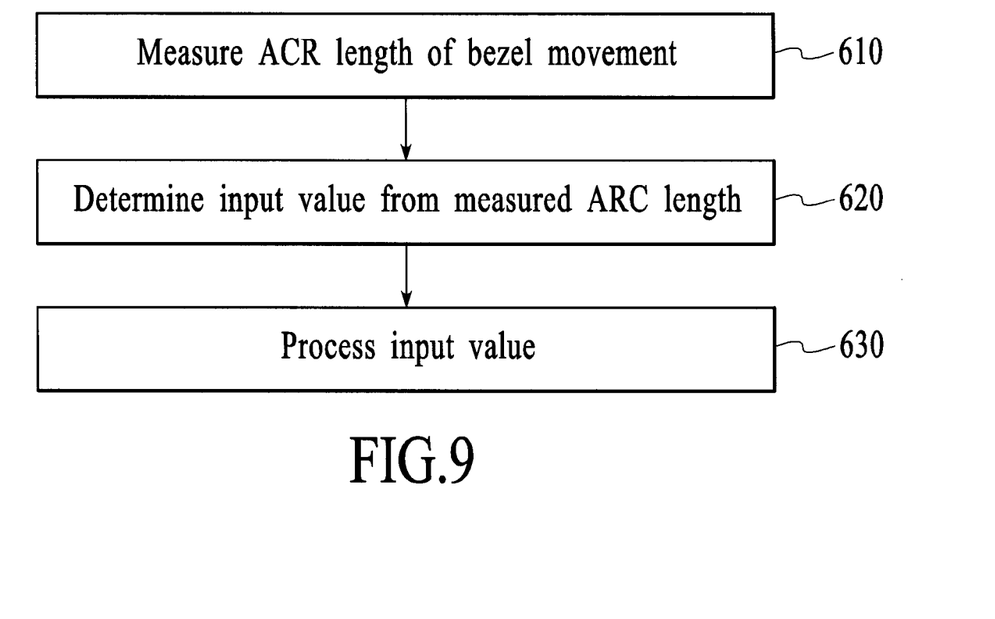
FIG. 9 illustrates a method for operating an electronic device with a bezel feature, under an embodiment of the invention.

FIG. 9 illustrates a method for processing input values created through use of a bezel feature. A method such as described in FIG. 9 may be used for mechanical bezel features shown in FIGS. 1-7, as well as virtual bezel features shown in FIG. 8.

In step 610, an arc length of a bezel rotation is measured. In an embodiment, pointer 112 (FIG. 1) may be moved along track 544 (FIG. 8) from a starting point to an end point. For example, arc length corresponds to a distance in which pointer 112 (FIG. 1) is moved 90 degrees along track 544 (FIG. 8). Then the arc length measured would be approximately one fourth of the perimeter provided by 544 (FIG. 8).

In step 620, an input value is determined from the measured arc length. The input value may be determined by detecting which one of the markers 415 (FIG. 7) is the finishing point after pointer 112 (FIG. 1) is moved. Alternatively, markers 415 (FIG. 7) may be uniformly spaced, and the number of markers crossed by pointer 112 (FIG. 1) may be counted.

The input value may be detected from analog data. The markers 415 may have distinctive voltage values that are in the form of analog data. Therefore, an intermediate step may be required to convert the input value from an analog format to a digital format.

In step 630, the input value is processed. The range of input values provided by the bezel feature is large. For example, one embodiment may provide for 360 possible input values from use of one of the bezel features described with FIGS. 1-8. As mentioned, the large range of values provided by the bezel feature may originally be in the form of an analog value. The bezel feature is particularly suited for applications where a large range of input values can be received.

In one example, the input value provided by the bezel features is useful for scrolling amongst a plurality of data entries appearing on the display. For example, display 130 (FIG. 1) may display entries beginning with the letter "A".

The bezel feature may be operated to create an input value corresponding to 100. The data entry that is displayed as a result of the bezel movement may be 100 entries after the entry displayed with "A".

Alternatively, the input value may measure a proportion. The proportion may be based on the amount of the full arc length the bezel feature is moved. For example, a user may move a bezel 90 degrees, corresponding to a quarter proportion. The result would be that the entry displayed would be one quarter of the stack of all entries, measured from the entry displayed.

In an embodiment, some or all of the entries between the starting point and finishing point of the pointer 112 (FIG. 1) are displayed. Alternatively, only the entry corresponding to the final position of the pointer 112 (FIG. 1) is displayed.

While embodiments described with FIG. 9 provide for a scrolling function to be performed from use of one of the bezels, other embodiments may utilize other functions for the bezel. Other embodiments may provide other operations to be performed as a result of an input value created from use of a bezel.

In one embodiment, one of the bezels described herein are employed to navigate within an application. A bezel may be used to enter a large value, such as for controlling color or contrast on display 130 (FIG. 1). Still further, the mechanical bezels may be employed to set a digital clock on the electronic device.

H. Hardware Description for Electronic Device

Figure 10:
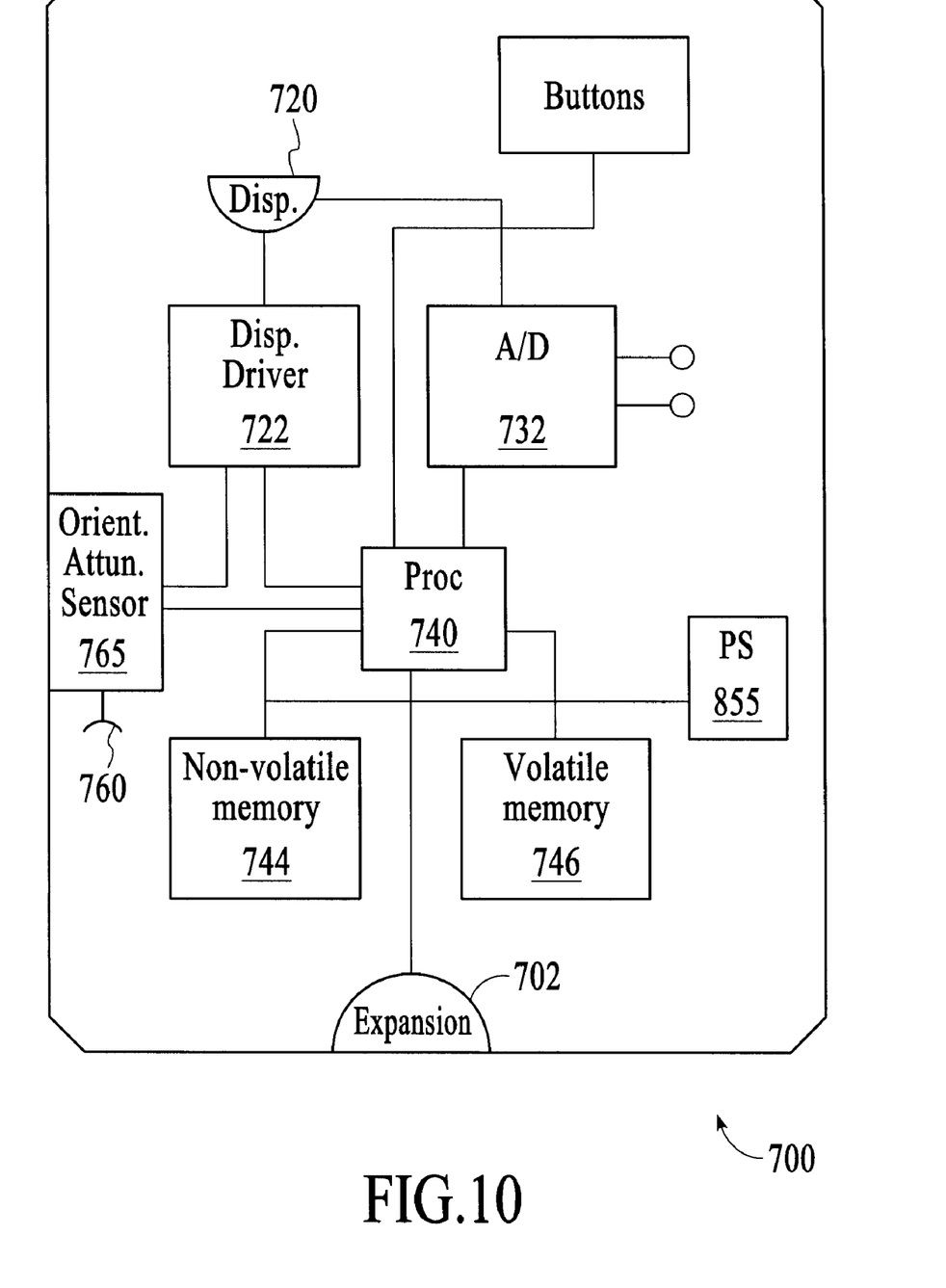
FIG. 10 is a block diagram for hardware components of an electronic device having a bezel feature, under an embodiment of the invention.

FIG. 10 is a block diagram for a handheld computer incorporating a bezel feature, under an embodiment of the invention.

In an embodiment, handheld computer 700 includes a processor 740 coupled to a first memory 744 (non-volatile) and a second memory 746 (volatile). The processor 740 is coupled to a display driver 722. The processor 740 combines with display driver 722 to process and signal data for presentation on a display assembly 720. The display assembly 720 includes screen and digitizer.

An analog-digital (AD) converter 732 is coupled to processor 740. A bezel feature 760 is coupled to a bezel interface 765. The bezel interface 765 may correspond to track 544 (FIG. 8). The bezel interface 765 is coupled to A/D converter 732. One or more channels from A/D converter 732 maybe used to convert analog input provided by the digitizer. The A/D converter 732 may also convert analog data provided by movement of the bezel 760.

The handheld computer 700 may include one or more expansion ports for coupling to accessory devices, such as cradles, modems, memory units, re-chargers and other devices. Examples of expansion ports include serial ports, Universal Serial Bus (USB) ports, CompactFlash slots and infra-red ports. In an embodiment shown, a first expansion port 702 enables one or more types of expansion modules to be connected to processor 740.

I. Alternative Embodiments

Figure 11:
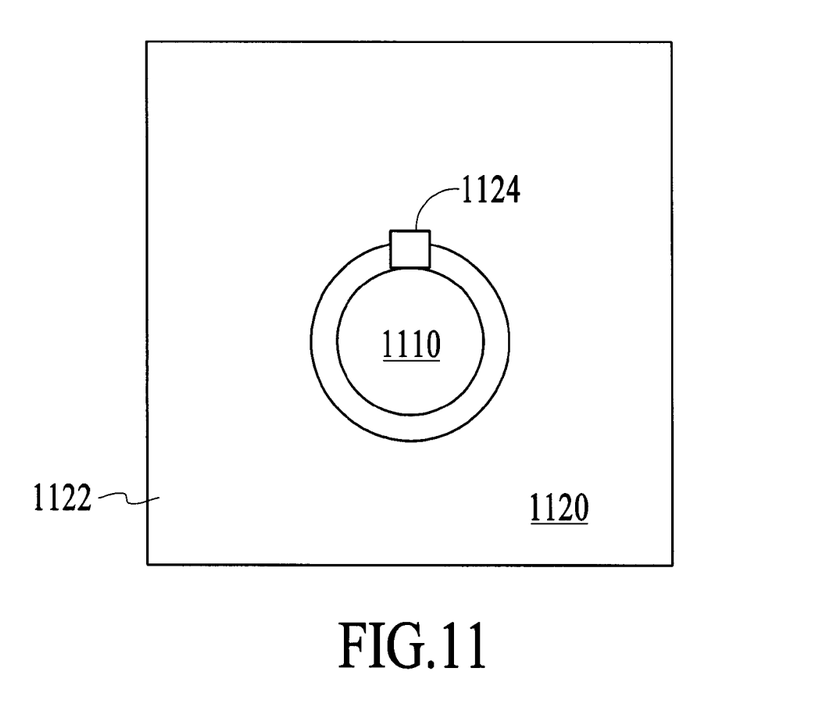
FIG. 11 is a block diagram illustrating an embodiment as shown and described by the corresponding specification.

In an embodiment, a bezel feature 1110 may correspond to a digitizer pad 1120 for a display assembly. For example, an electronic device such as shown with FIGS. 4 and 5 may include a display assembly comprised of the digitizer 1120 and a display screen. The digitizer 1120 is touch-sensitive, and detects contact at a particular position 1122 on its surface 1124. The contact may be detected as an analog value. According to one embodiment, the digitizer may be rotatable over the display screen.

J. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An electronic device comprising:
   a housing;
   a contact-sensitive display assembly including a screen provided on a front panel of the housing; and
   a processor coupled to the display assembly and configured to:
   output a bezel feature on the display assembly, the bezel feature being displayed as a complete circumferential track, wherein the track is formed by a pair of concentric ellipses such that input, which corresponds to a contact on a starting point on any position of the track to a finishing point on the track, can be accepted via the display assembly;
   detect the contact on the display assembly;
   determine an input based on the contact, wherein the input is based on a position of at least one of the starting point and the finishing point; and
   perform an operation based on the input.

2. The electronic device of claim 1, wherein the processor is configured to display the bezel feature on a perimeter of the screen of the display assembly.

3. The electronic device of claim 1, wherein in response to detecting the contact, the processor is configured to present one or more items on the screen of the display assembly for selection.

4. The electronic device of claim 1, wherein in response to detecting the contact, the processor is configured to perform one or more operations, the one or more operations being selected based on the contact being interpreted as a radial change in position of a graphic feature on the track.

5. The electronic device of claim 1, wherein the processor is configured to perform one or more operations based on one or more of a duration of the contact.

6. The electronic device of claim 1, wherein the processor is configured to perform the operation that corresponds to scrolling a plurality of entries.

7. The electronic device of claim 1, wherein the processor is configured to perform the operation corresponding to launching an application.

8. The electronic device of claim 1, wherein the processor is configured to perform the operation corresponding to navigating within an application.

9. The electronic device of claim 1, wherein the processor is configured to detect the contact as being continuous between the starting point and the finishing point.

10. The electronic device of claim 1, further comprising a digitizer that is provided as part of the display assembly.

11. The electronic device of claim 10, wherein the digitizer is touch-sensitive.

12. The electronic device of claim 1, wherein the input is detected as an analog value.

* * * * *